United States Patent
Azam

(10) Patent No.: US 6,339,867 B1
(45) Date of Patent: Jan. 22, 2002

(54) LACE FASTENER

(75) Inventor: Guy Azam, Aix-le-Bains (FR)

(73) Assignee: Salomon S.A., Metz-Tessy (FR)

( * ) Notice: Subject to any disclaimer, the term of this patent is extended or adjusted under 35 U.S.C. 154(b) by 0 days.

(21) Appl. No.: 09/649,062

(22) Filed: Aug. 29, 2000

(30) Foreign Application Priority Data

Sep. 8, 1999 (FR) .............................. 99 11396

(51) Int. Cl.$^7$ .............................. A43C 7/08; F16G 11/10
(52) U.S. Cl. .................. 24/712.5; 24/115 G; 24/136 A; 24/712.1; 24/712.6; 24/713.5
(58) Field of Search ............................ 24/712.5, 712.6, 24/713.5, 136 A, 115 G, 115 L

(56) References Cited

U.S. PATENT DOCUMENTS

| | | | |
|---|---|---|---|
| 307,806 A | | 11/1884 | Sailer |
| 2,200,895 A | | 5/1940 | Rio .............................. 24/117 |
| 2,315,196 A | * | 3/1943 | Gallione .................... 24/713.5 |
| 4,379,358 A | | 4/1983 | Wibrow .................... 24/136 R |
| 4,665,590 A | * | 5/1987 | Udelhofen et al. ....... 24/136 R |
| 4,803,759 A | * | 2/1989 | Kemble ................... 24/30.5 R |
| 4,878,269 A | * | 11/1989 | Anscher et al. ........... 24/115 G |
| 5,361,461 A | * | 11/1994 | Anscher .................... 24/115 G |
| 5,477,593 A | | 12/1995 | Leick .......................... 24/12.5 |
| 5,924,178 A | * | 7/1999 | Holmberg .................. 24/712.5 |

FOREIGN PATENT DOCUMENTS

EP 0629793 12/1994

* cited by examiner

Primary Examiner—Victor N. Sakran
(74) Attorney, Agent, or Firm—Greenblum & Bernstein, P.L.C.

(57) ABSTRACT

A device for fastening a flexible tie has a hollow body provided with a guiding channel that forms a funnel for a translationally movable blocking element, this blocking element being subject to the constant action of an elastic element. The hollow body is housed in a case where it can move translationally parallel to the blocking element, and the blocking element is maintained in the case, on one side by virtue of the elastic element that acts directly between the blocking element and the case, and on other side by virtue of an abutment. A retractable abutment makes it possible to retain the hollow body against the blocking element to block the tie, or to release this hollow body so as to enable the sliding of the tie. The fastening device is particularly adapted to ensure the adjustment of a garment or a shoe by means of a tie, such as a lace.

9 Claims, 4 Drawing Sheets

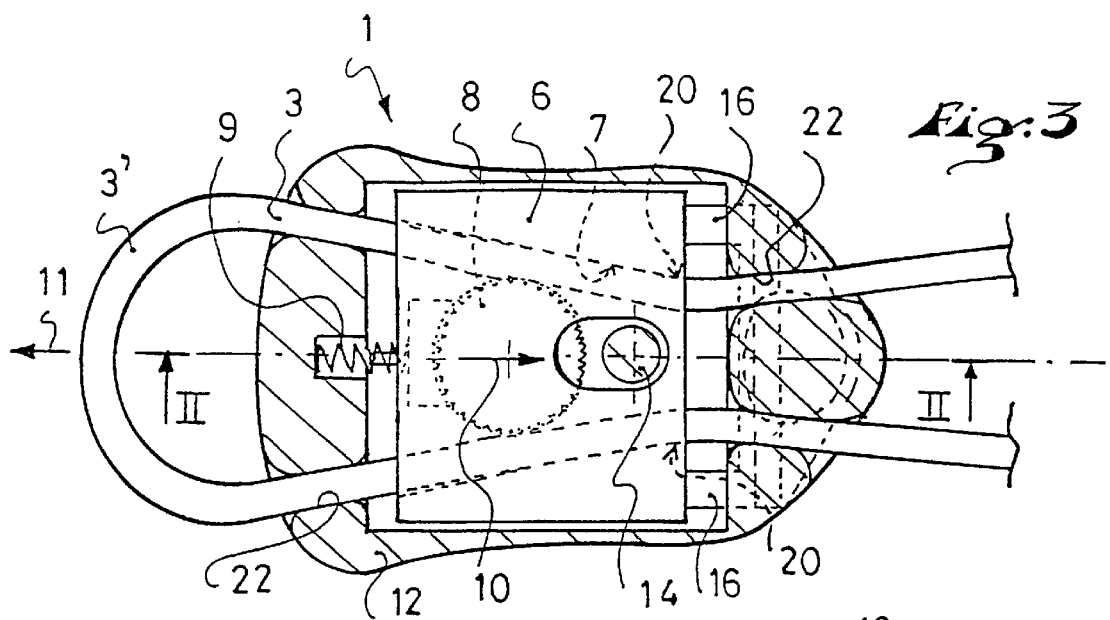
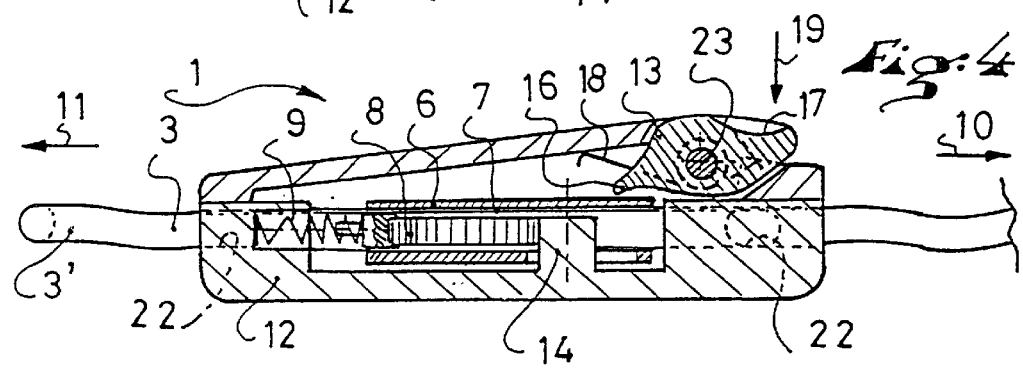
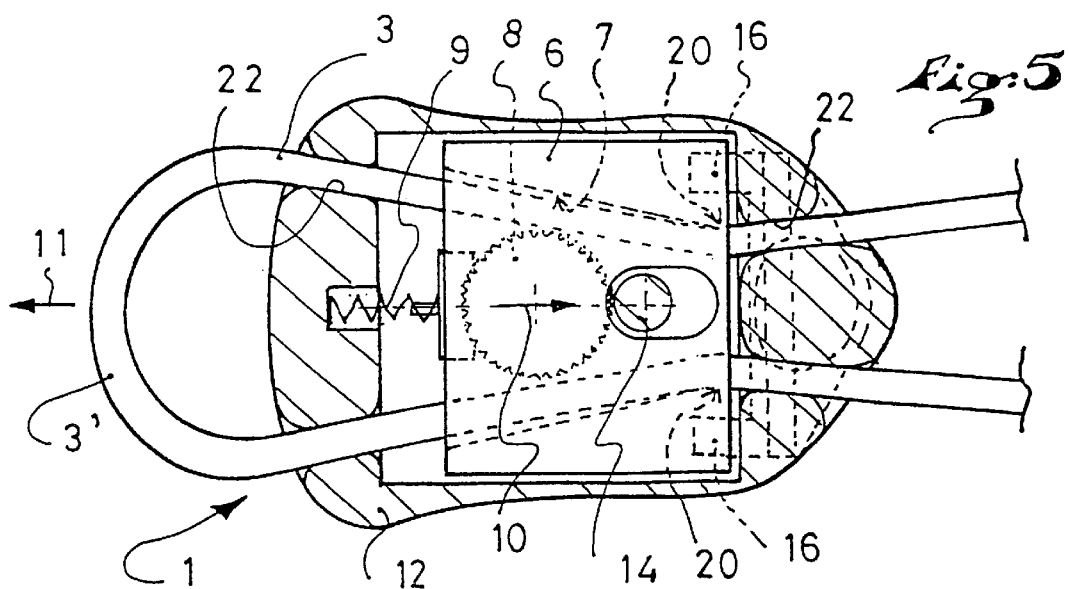

LACE FASTENER

BACKGROUND OF THE INVENTION

1. Field of the Invention

The present invention relates to a device for fastening a flexible lace or tie, having a hollow body provided with a guiding channel that forms a funnel for a translationally movable blocking element, this blocking element being subject to the constant action of an elastic element pushing it in the funnel where the tie passes.

2. Description of Background and Relevant Information

Known fastening devices of the aforementioned type, commonly called lace fasteners, are mostly used for clothing to ensure the tightening and/or adjustment of a garment or a shoe by means of a lace, as well as for luggage. These lace fasteners advantageously replace knots, because it suffices to make them slide along the free ends of one or both strands of the lace in the tightening and/or adjustment direction until reaching the desired blocking position, so that the tightening system is automatically closed, regardless of the tension exerted on the retained ends of the strands.

By way of example, U.S. Pat. No. 307,806; U.S. Pat. No. 2,200,895; and European Patent Publication No. 0 629 793 describe such lace fasteners.

According to these documents, the lace fastener has a hollow body whose guiding channel forms a funnel within which a translationally movable blocking element is subject to the action of a spring. This spring is arranged so as to constantly push the movable blocking element against the edges of the guiding channel, on the side where the latter narrows down, so as to clamp the strands of the lace that are interposed. Due to these arrangements, the movable blocking element functions as a wedge that automatically prevents the sliding of the strands of the lace only when the latter are biased to displace in the same direction as that of the thrust of the elastic element. Indeed, in the case where the strands are biased in the direction opposite the action of the latter, it only suffices that the pulling force to which they are subjected be sufficient to counterbalance this action and the frictions resulting therefrom to enable the strands to slide in the guiding channel of the hollow body. This type of lace fastener therefore makes it possible to automatically block one or both strands of a lace in only one sliding direction, which is preferably selected to correspond to the tightening, and to brake the strand(s) of the lace in the opposite direction.

Therefore, it suffices to position the lace fastener on the free ends of the strands of the lace so that it can slide thereon in the tightening direction and be blocked in the opposite direction, i.e., in the loosening direction. The lace fastener thus makes it possible to modify/adjust the length of the ends of the strands of the lace, which are retained in the tightening system while ensuring the automatic closure thereof as soon as the lace fastener is released.

In practice, the user first exerts a traction on the free ends of the lace with one hand, and then moves the lace fastener down along the strands to the closest point to the retaining and guiding members of the tightening system with the other hand.

These documents also describe that a control element is associated with the movable blocking element in order to enable the voluntary unlocking of the lace fastener on the strands of the lace, and thus the release of the lacing system, and even its loosening.

More specifically, in these prior art embodiments, the unlocking of the lace fastener is undertaken by exerting, on the control element, a traction that forces the blocking element to move back relative to the funnel formed by the channel, and against the thrust which the spring exerts on the latter.

Due to this traction, the blocking effect is suppressed, and the lace fastener can slide on the free ends of the strands of the lace while inherently increasing the length of the ends of the strands that are retained in the tightening system. Consequently, the latter is free to loosen itself by at least the value of this increase in length.

Conversely, as soon as the traction on the control element ceases, the spring automatically returns the blocking element against the strands of the lace and once again causes the blocking of the lace fastener. It is therefore necessary to manually maintain the tensile force on the control element as long as the desired loosening is not achieved. The manipulation for unlocking these lace fasteners, and in particular the estimation of the length of the lace, or of the tie, to be released to obtain the adequate loosening therefore require the constant attention of the user.

Moreover, in view of the small size of the lace fasteners, and therefore of the small size of their control element, the user's movements must be very precise to catch or grasp the latter and displace it translationally with respect to the hollow body. Of course, this need for precise movements is less when the control element is particularly prominent with respect to the hollow body, as in the embodiments described in U.S. Pat. No. 2,200,895. It is also the case when the control element is provided with a profiled zone adapted to serve as a seat for the tip of a finger, as disclosed in the European Patent Publication No. 0 629 793.

The fact remains true that even with these special arrangements, the manipulation can present a forbidding aspect, especially when the user is wearing gloves, which is frequent in cold regions in winter. Indeed, in spite of the fact that the control element is prominent, the gloves keep from perceiving its exact position, especially as the lace fasteners are generally positioned in protected or relatively hidden zones, whether on clothes, shoes, luggage, etc.

Therefore, the user is often forced to remove his/her gloves to unlock and maneuver this known type of lace fasteners.

SUMMARY OF THE INVENTION

An object of the present invention is to overcome the aforementioned drawbacks and to provide the user with a control mechanism that is capable of neutralizing the automatic blocking function of the fastening device on the tie, in a stable manner in the tie loosening direction, on the one hand, and of re-engaging this automatic blocking function as soon as the tie is displaced in the tightening direction, on the other hand. The user is thus exempt from manually and constantly maintaining the control mechanism in the position corresponding to the unlocking to obtain the desired loosening. The user is also exempt from reactivating the control mechanism to reengage the blocking function, since it is only necessary to pull on the tie in the tightening direction to place the fastening device back in its initial position.

Another object of the invention is to provide a control mechanism that is easy to reach and can be actuated by a mere pressure, rather than requiring a translational displacement. The user can thus keep his/her gloves on and can possibly use another piece of equipment, such as a ski pole, for example, to act on the control mechanism.

According to the invention, the device for fastening a flexible tie or lace has a hollow body provided with a guiding channel that forms a funnel in which a translationally movable blocking element is subject to the constant action of an elastic element that pushes it into the funnel where the tie passes, this arrangement making it possible to block the latter when it is biased to slide in the same direction as the blocking element, and to allow it to slide in the opposite direction against the thrust of the elastic element.

The hollow body of the fastening device is housed in a case where it can be displaced translationally parallel to the blocking element, and the blocking element is maintained translationally in the case, on one side by means of the elastic element that acts directly between it and the case, and on the opposite side by means of a stationary abutment, affixed to the case.

Also, a retractable abutment is provided on the case to cooperate with the hollow body so as to position it under pressure against the blocking element, or to leave it free to move away therefrom. More specifically, the retractable abutment, in a first position, retains the hollow body under pressure against the blocking element and the interposed tie. Conversely, the retractable abutment, in a second position, is retracted and leaves the hollow body free in translation with respect to the case and the blocking element which, then pressing on the abutment of the case, is neutralized opposite the tie.

According to one embodiment, the tie has two strands that are guided in the hollow body, in a substantially symmetrical manner along the guiding channel, by following the funnel shape thereof. Relative to the strands of the tie, guiding conduits are obtained in the case with respect to the position and spacing of the latter at their exit from the hollow body.

In one construction mode, the retractable abutment is constituted of a piece that tilts about an axis. This tilting piece has a stop finger directed towards the hollow body to enable the retention of the latter in the case against the blocking element, on the one hand, and a control mechanism directed toward the outside of the case to retract the stop finger with respect to the hollow body and thus enable the release of the latter in the case and opposite the blocking element, on the other hand.

Complementarily, a return spring is integrated in the retractable abutment to automatically places its stop finger in the position for retaining the hollow body as soon as the latter, after its translational displacement in the case, is correctly positioned with respect to the blocking element to clamp the tie. According to a preferred construction, the return spring constantly biases the stop finger toward the hollow body, which, due to the induced friction, prevents the latter from wobbling in the case when the retractable abutment is retracted.

According to a feature of the fastening device, the control mechanism of the retractable abutment can be actuated in a transverse, or even substantially perpendicular direction with respect to the direction of translational displacement of the hollow body in the case. Consequently, it only takes a mere pressure on the control mechanism, directed perpendicular to the case, to retract the stop finger with respect to the hollow body that can then move away from the blocking element and allow the tie to slide freely in the loosening direction.

In another construction mode, the retractable abutment is constituted by a push-button that is centered transversely in the direction of translational displacement of the hollow body.

According to a preferred construction mode, the push-button controls a stop finger that fulfills two successive functions, one of which consists of retaining the hollow body for the tightening position, i.e., with automatic blocking, and the other of which consists of translationally stopping the blocking element for the loosening position, i.e., with a release of the tie. In this construction, the push-button is an elastic lug that forms a portion of the wall of the case, and a free end of which is provided with a control mechanism directed outwardly and a stop finger directed inwardly. A chamfer is obtained in the made lug so as to permit its flexional displacement toward the hollow body when a pressure is exerted on the control element in order to retract the stop finger with respect to the latter. Furthermore, this chamfer extends in the thickness of the stop finger where it constitutes a notch offering a passage that enables the hollow body to displace translationally in the case, in the direction of the stop finger, although the latter is further prominent therein as a result of the thrust applied on the control mechanism. With these arrangements, when the stop finger is retracted with respect to the hollow body, it becomes active opposite the blocking element. Indeed, the hollow body displaces in the direction of the stop finger, beyond its initial retaining position, due to the notch of the stop finger; and it is the blocking element which, pushed by its elastic element into the funnel formed in the guiding channel of the tie, comes to abut against the stop finger. In this position, the tie is no longer clamped and therefore can slide freely in the loosening direction, on the one hand, and due to the fact that the elastic lug tends naturally to return to its initial position, the stop finger takes support, via the notch, against the hollow body and in a transverse direction with respect the latter, on the other hand. Thus, as previously, the stop finger prevents the hollow body from wobbling in the case.

In the various construction modes disclosed hereinabove, re-engaging the automatic blocking function simply requires that the hollow body be brought back against the blocking element.

To this end, the funnel-shaped guiding channel of the hollow body is provided with a friction surface that opposes a certain resistance to the sliding of the tie in the direction of the blocking element. This friction surface is obtained such that the induced force that opposes the sliding causes the displacement of the hollow body in the case, at the same time as the blocking element and against the thrust of the elastic element. In this way, since the hollow body is returned to its initial position against the blocking element, with respect to the case, the stop finger of the retractable abutment can tilt in the active retaining position of the hollow body.

To further promote the return of the hollow body against the blocking element, and therefore to increase the intensity of the induced force that opposes sliding, the guiding conduits obtained in the case are further spaced apart than the strands of the tie at their exit from the hollow body.

BRIEF DESCRIPTION OF DRAWINGS

The invention will be better understood upon reading the following description, with reference to the annexed schematic drawing that show two embodiments, and in which:

FIG. 3 shows the fastening device of FIG. 2 in a cross-sectional view along the line III—III;

FIGS. 4 and 5 show the fastening device of FIGS. 2 and 3 with its function of automatically blocking the tie being neutralized, i.e., placed in the loosening position.

DETAILED DESCRIPTION OF THE INVENTION

Figure 1:
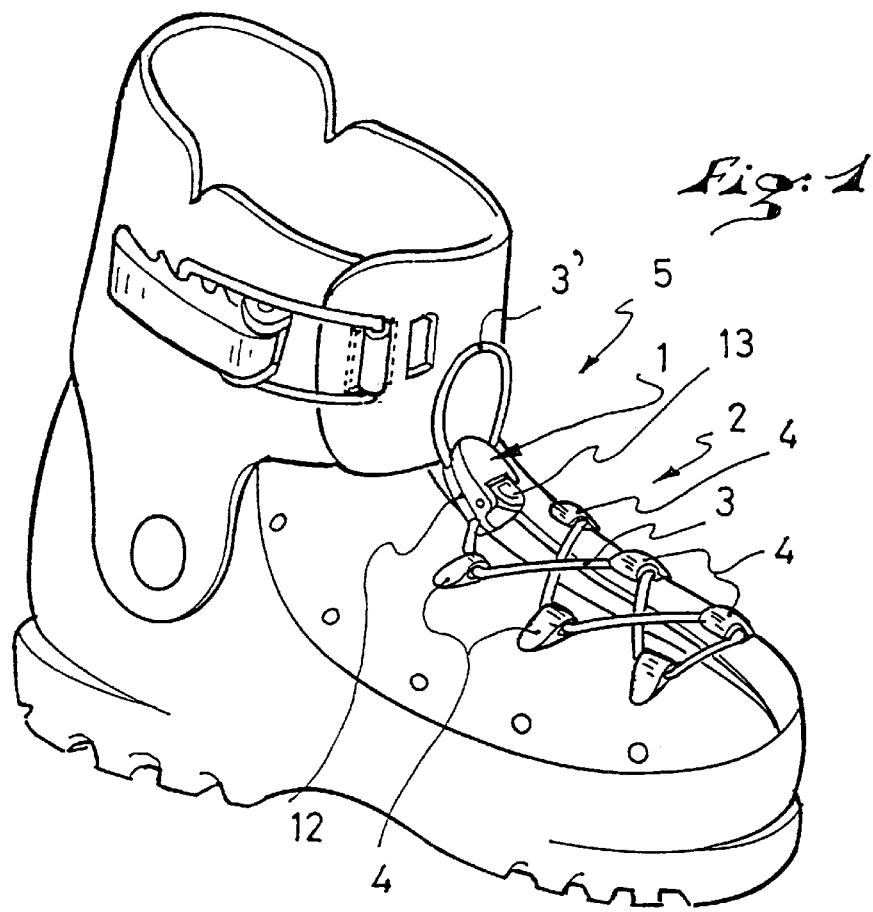
FIG. 1 shows a perspective view of a sports boot having a tightening system with a tie that is provided with a fastening device according to a first embodiment.

In the example shown in FIG. 1, the fastening device 1 is used on a boot 5 whose tightening system 2 uses a lace 3 as a tie, and keepers or eyelets 4. The tightening system 2 is shown on the portion of the boot 5 that corresponds to the front zone of the user's foot, but could, of course, extend to the portion that surrounds the ankle.

As shown more particularly in FIGS. 2–5, the fastening device 1 has a hollow body 6 provided with a guiding channel 7 that forms a funnel, and a blocking element 8 that is movable translationally in the funnel 7 and is subject to the action of an elastic element 9 that constantly pushes it therein.

According to one characteristic, the hollow body 6 is housed in a case 12 where it is susceptible of being displaced translationally parallel to the blocking element 8, between two extreme positions determined by a retractable abutment 13 located on the case 12. More specifically, the retractable abutment 13 is constituted of a piece tilting about an axis 23 having at least one stop finger 16 directed toward the hollow body, and a control mechanism 17 directed toward the outside of the case 12. Furthermore, a return spring 18 is integrated in the retractable abutment 13 to constantly bias its stop finger 16 toward the hollow body 6.

The blocking element 8 is maintained in a elastic manner in the case 12, on one side by means of the elastic element 9 that interacts between it and the latter, and on the other side by means of an abutment 14 carried by the case 12. The two strands of the lace 3 are preferably guided in the hollow body 6, in a substantially symmetrical manner, along the guiding channel 7 by following the funnel shape of the latter. Conduits 22 for guiding the strands of the tie 3 are then made in the case 12 with respect to the position and spacing of the strands at their exit from the hollow body 6.

Figure 2:
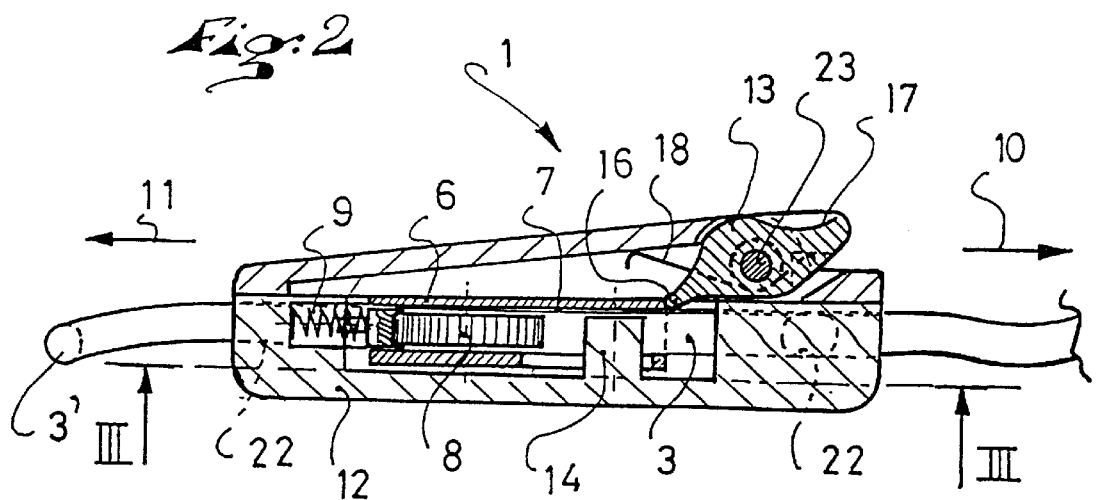
FIG. 2 is a cross-sectional view of the fastening device of FIG. 1, seen along the line II—II of FIG. 3 showing the fastening device with its function of automatically blocking the tie being engaged, i.e., placed in the tightening position.

These various arrangements therefore make it possible either to retain the hollow body 6 under pressure against the blocking element 8 when the stop finger 16 is engaged, as shown in FIGS. 2 and 3, or to release the hollow body 6 with respect to the blocking element 8 when the stop finger 16 is retracted, as shown in FIGS. 4 and 5.

In fact, when the hollow body 6 is maintained pressed against the blocking element 8, FIGS. 2 and 3, the fastening device 1 functions in the same manner as the known devices from the previously cited prior art. Indeed, the tie 3 is clamped between the funnel of the guiding channel 7 of the hollow body 6 and the blocking element 8 that is pushed by the elastic element 9 into the funnel, as indicated by the arrow 10. As a result, any bias on the tie 3 that tends to cause it to slide in the same direction as that 10 of the thrust of the elastic element 9 causes its outright blocking by the blocking effect of the element 8.

Inversely, a bias in the opposite direction, as indicated by the arrow 11, causes a relative displacement of the blocking element 8 in this same direction 11 against the thrust of the elastic element 9 that bends proportionately, and this as long as the force that opposes the sliding of the tie 3 in the guiding channel 7 remains greater than the resisting force of the elastic element 9. Then, as soon as the ratio of forces is inverted, the tie 3 slides in the guiding channel 7 while maintaining the blocking element 8 at a distance from the hollow piece 6.

In this position 6 for retaining the hollow body 6 against the blocking element 8, the function of automatically blocking the fastening device 1 on the tie 3 is therefore ensured. Indeed, the tightening is carried out by pulling on the half-loop 3' of the tie 3 that slides in the direction 11, and as soon as the traction ceases, the elastic element 9 pushes the blocking element 8 back against the hollow body 6 into the funnel formed in the guiding channel 7, once again causing the blocking of the tie 3 in the direction 10 that corresponds to the loosening direction.

Conversely, when the hollow body 6 is released with respect to the blocking element 8, as is shown in FIGS. 4 and 5, the automatic blocking function is neutralized. Indeed, as soon as the hollow body 6 is released by the stop finger 16 of the retractable abutment 13, which can be actuated by a mere pressure according to the arrow 19 on the control mechanism 17, the blocking element 8 then displaces in the direction 10 under the thrust of the elastic element 9, and stops against the abutment 14 of the case 12. In its displacement, the blocking element drives along the hollow body 6 which, released in translation with respect to the blocking element as soon as the latter presses on the stationary abutment 14, releases the tie 3 that can then slide in the loosening direction 10. As is particularly visible in FIG. 4, the hollow body 6 is then engaged and maintained beneath the stop finger 16 of the retractable abutment 13, which prevents the wobbling thereof in the case 12 and the sudden re-engagement of the latter. The control of the loosening of the tie 3 by means of the retractable abutment 13 therefore provides a stable position that saves the user from maintaining pressure, or any other action, on the fastening device 1 to obtain an adequate loosening.

With respect to reengaging the automatic blocking function, it is noted that it suffices to return the hollow body 6 toward the blocking element 8 and against the thrust of the elastic element 9 until reaching its initial position, so-called "retaining position," where the stop finger 16 of the retractable abutment 13 can tilt in the active position under the action of the return spring 18, FIGS. 2 and 3. So that this maneuver can be undertaken simultaneously with the tightening maneuver, in the direction 11, the funnel-shaped guiding channel 7 is provided with a friction surface 20 that opposes a certain resistance to the sliding of the tie 3. This friction surface 20, which is more particularly located on the narrowest side of the funnel in the guiding channel 7, is obtained such that the induced force that opposes the sliding of the tie 3 causes the displacement of the hollow body 6 in the direction 11 at the same time as the blocking element 8 and forces the elastic element 9 to bend. The reengaging of the automatic blocking function thus occurs simultaneously with a tightening maneuver by pulling on the half-loop 3' of the tie 3 in the direction 11, whereas the case 12 of the fastening device 1 is retained or moved down along the strands of the tie 3 to the closest point to the retaining elements 4, such as the keepers of the tightening system 2 shown in FIG. 1.

It is to be understood that the tightening system 2 can have a tie 3 having a single strand or two strands.

Moreover, the fastening device 1 described in this example of application is merely mounted on the tie 3 of a tightening system 2 of the lacing type, but can be fixed on a support such as a portion of a boot upper, of a garment or luggage, without leaving the scope of the invention.

Furthermore, the blocking element 8 could be wedge-shaped rather than circular.

Figure 6:
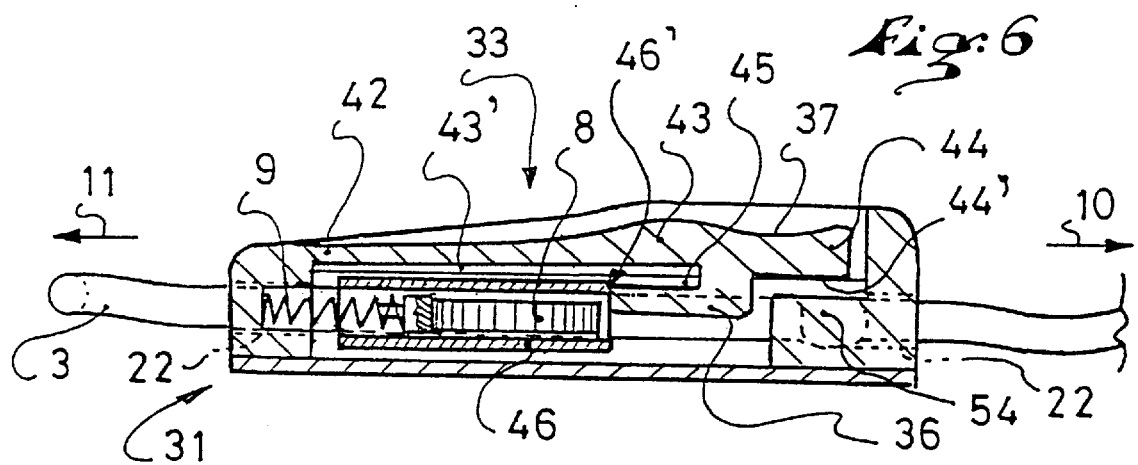
FIGS. 6, 7, 8 and 9 show a fastening device according to a second embodiment.
Figure 7:
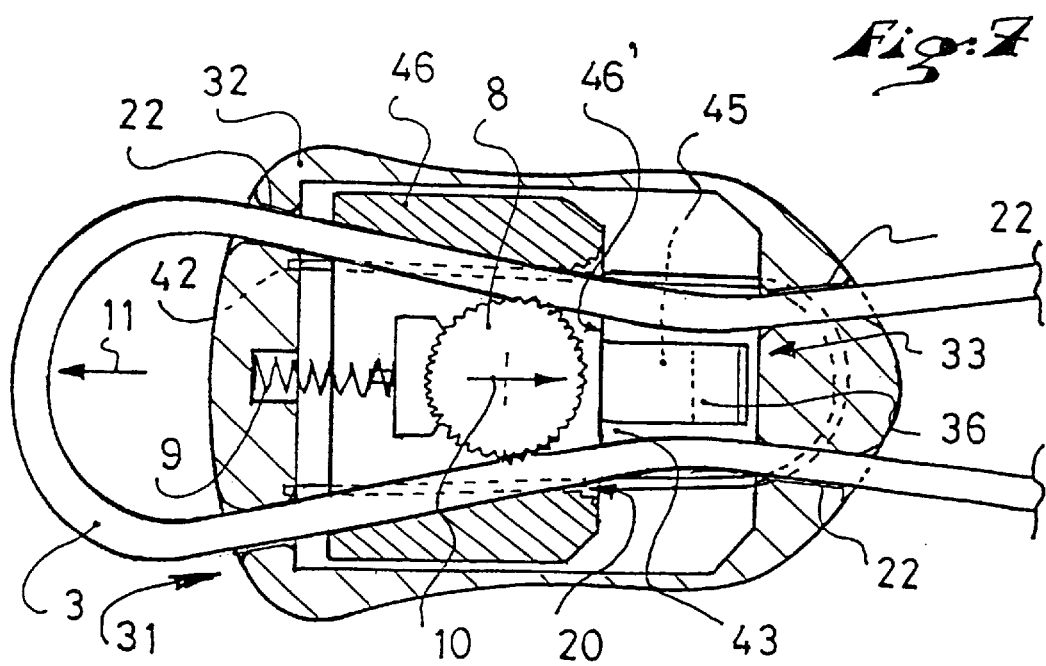
Figure 8:
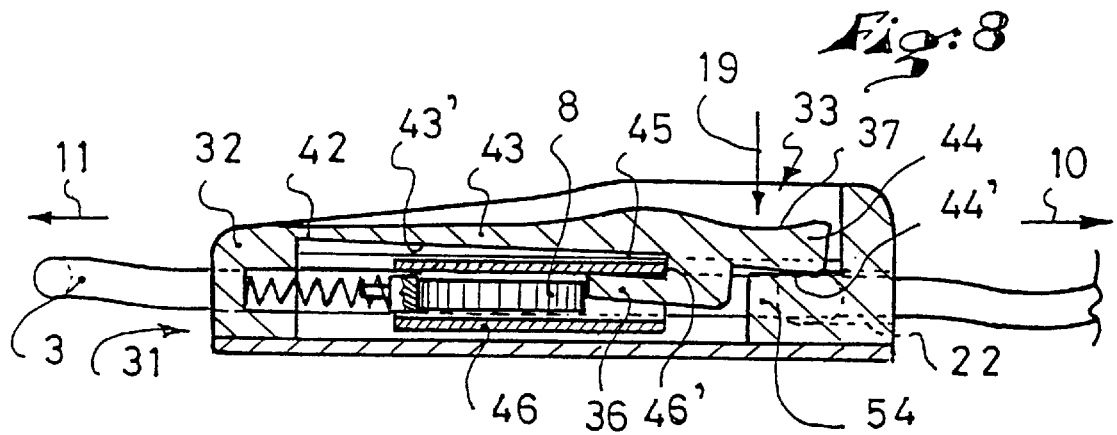
Figure 9:
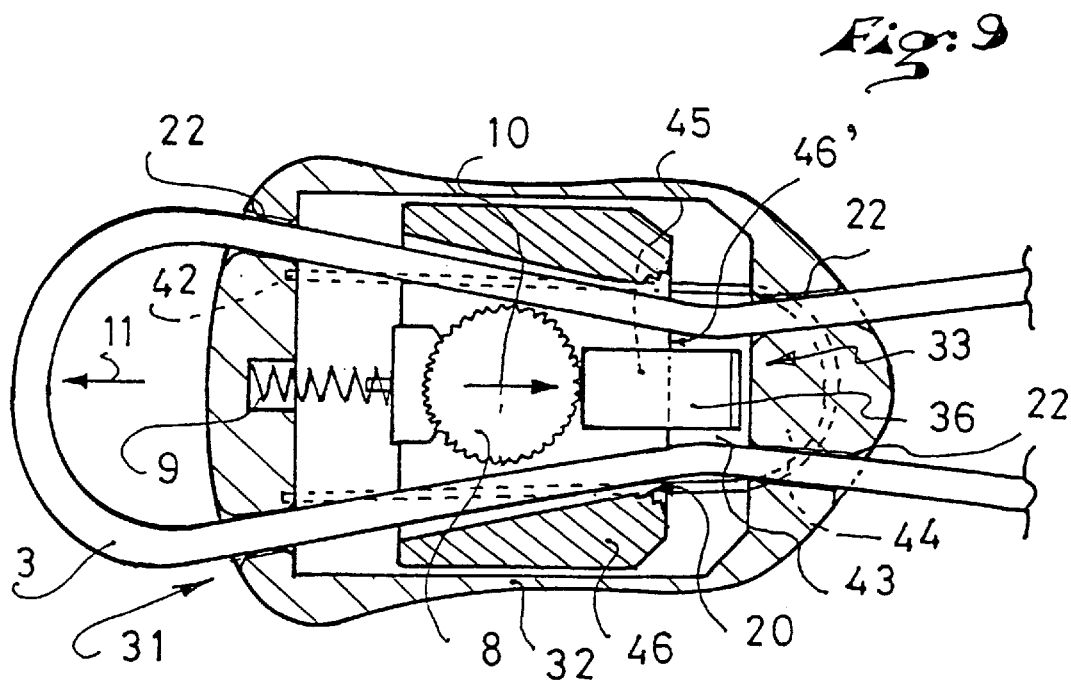

According to a second embodiment of the fastening device 31, such as shown in FIGS. 6, 7, 8 and 9, the retractable abutment 33 is in the form of a push-button formed of an elastic lug 43 that constitutes a portion of the wall of the case 32, and a free end 44 that is provided with a control mechanism 37 directed outwardly, and of a stop finger 36 directed inwardly. This elastic lug 43 is provided with a chamfer 43' opposite the hollow body 46, which makes it possible to displace it in flexion toward the latter by a pressure exerted on the control mechanism 37 located at its free end 44. A notch 45 extends the chamfer 43' in the stop finger 36 to offer a passage for the hollow body 46 when the stop finger 36 is retracted with respect to the latter, as shown in FIGS. 8 and 9, i.e., when the automatic blocking function is neutralized in view of enabling the loosening of the tie 3.

Due to these various arrangements, the stop finger 36 in fact fulfills two successive functions, one of which is a retention of the hollow body 46 for the tightening position, and the other of which is an abutment for the blocking element 8 for the loosening position.

More specifically, in a first position, when the automatic blocking function of the fastening device 31 is engaged, FIGS. 6 and 7, the retractable abutment 33 projects outwardly with respect to the case 32, and its stop finger 36 is positioned in front of the hollow body 46 which it maintains pressed against the blocking element 8 subjected to the constant action of its elastic return 9.

In a second position, when the automatic blocking function is neutralized, FIGS. 8 and 9, the retractable abutment 33 is partially pushed into the case 32, and the notch 45 is positioned opposite the hollow body 46, in particular opposite its previous retaining zone 46'. Because the hollow body 46 is thus released, the thrust exerted by the elastic element 9 on the blocking element 8 and the interposed tie 3 causes its translational displacement in the notch 45, in the direction of stop finger 36 until the blocking element 8 abuts against the latter. From there, since the hollow body 46 remains free to move away from the blocking element 8, no more pressure is exerted on the tie 3 that can then slide freely in the loosening direction indicated by the arrow 10.

The stop finger 36 in fact replaces the stop finger 16 and the abutment 14 of the fastening device 1 described with reference to FIGS. 1–5.

According to certain details of construction, the elastic lug 43, and in particularly its free end 44, is limited in its travel when the retractable abutment 33 is pushed down along the arrow 19 so as to correctly position the notch 45 in front of the retaining zone 46' of the hollow body 46. To this end, a shoulder 54 is formed in the case 32 opposite a support edge 44' obtained in the free end 44 of the elastic lug 43.

This embodiment of the fastening device 31 is different from the preceding fastening device 1 only in the design of the retractable abutment 33. Therefore, the other constituent elements do not change.

The same is true for the description of the reengaging of the automatic blocking function that is carried out as previously.

The instant application is based upon French patent application No. 99 11396, filed Sep. 8, 1999, the disclosure of which is hereby incorporated by reference thereto in its entirety, and the priority of which is hereby claimed under 35 USC § 119.

What is claimed is:

1. A device for fastening a flexible tie, said device comprising:

a hollow body provided with a guiding channel, said channel forming a funnel, a blocking element is positioned for translational movement in the funnel subject to the action of an elastic element, the elastic element pushing the blocking element into the funnel where the tie passes, in view of blocking the latter when it is biased to slide in the same direction as the blocking element, and of enabling it to slide in the opposite direction against the thrust of the elastic element;

the hollow body being housed in a case, the hollow body being translationally displaceable in the case parallel to the blocking element; and the blocking element being maintained in translation in the case, on one side by means of the elastic element acting directly between it and the case, and on the opposite side by means of an abutment carried by the case, a retractable abutment being provided on the case so as to retain the hollow body under pressure against the blocking element and the interposed tie, in a first position, and to leave the hollow body free in translation with respect to the case and the blocking element, in a second position.

2. A device according to claim 1, wherein the tie has two strands that are guided in the hollow body, in a substantially symmetrical manner along the guiding channel, by following the funnel shape of the latter, and wherein conduits for guiding the strands of the tie are provided in the case with respect to the position and spacing of the strands of the tie at their exit from the hollow body.

3. A device according to claim 1, wherein the retractable abutment is constituted of a piece that tilts about an axis, this tilting piece having a stop finger directed toward the hollow body to enable the retention of the latter in the case against the blocking element, on the one hand, and a control mechanism directed toward to the outside of the case to retract the stop finger with respect to the hollow body and thus enable the release of the latter in the case and opposite the blocking element, on the other hand, a return spring constantly biasing the stop finger toward the hollow body.

4. A device according to claim 3, wherein the control mechanism of the retractable abutment can be actuated along a transverse direction with respect to the translational displacement of the hollow body in the case.

5. A device according to claim 1, wherein the retractable abutment is in the form of a push-button formed from an elastic lug that constitutes a portion of the wall of the case, said elastic lug having an end affixed to the latter and a free end that is provided with a control mechanism directed outwardly and with a stop finger directed inwardly.

6. A device according to claim 4, wherein the funnel-shaped guiding channel of the hollow body comprises a friction surface that opposes a certain resistance to the sliding of the tie, such that the force that opposes the sliding of the latter during tightening causes the displacement of the hollow body in the case, at the same time as the blocking element and against the thrust of the elastic element, until bringing it in a predetermined position enabling the stop finger of the retractable abutment to tilt in the active position thus ensuring the retention of the hollow body in the opposite direction against the blocking element.

7. A device according to claim 6, wherein the fastening device is fixed on a support.

8. A device according to claim 1, wherein the blocking element has a circular shape.

9. A device according to claim 1, wherein the blocking element is wedge-shaped.

* * * * *